Patented June 18, 1940

2,204,981

UNITED STATES PATENT OFFICE 2,204,981

COATING COMPOSITION

John Waldo Clough, Parlin, N. J., assignor to E. I. du Pont de Nemours & Company, Wilmington, Del., a corporation of Delaware No Drawing. Application June 16, 1937, Serial No. 148,512

2 Claims. (Cl. 134—79)

This invention relates to improvements in coating compositions, and more particularly to coating compositions which provide "flat" finishes.

Flat or "matte" finishes prepared from conventional oil type finishes have long been known and were produced by laborious rubbing operations or through the incorporation of semi-transparent solids in the composition, whereby the desired satin-like finish was obtained. More recently these same principles have been applied to cellulose derivative coating compositions where the popularity of the satin finish has likewise been maintained. The customary rubbing operations proved to be expensive and time-consuming, and for this reason, the alternative method of incorporating certain solids in the cellulose derivative lacquer has found greater favor.

A number of materials have been used to produce this dull or flat effect. Among these were clay and magnesium and calcium carbonates. These materials, while approximating a rubbed appearance in the resulting finishes, were more or less opaque and imparted an undesirable gray hazy cast to the finish. When used for finishing wood surfaces such compositions also partially obscured the grain of the wood and gave the article a muddy appearance.

Later other materials were discovered which were more transparent when suspended in cellulose derivative compositions than were the earlier types. Among these may be mentioned the metallic stearates such as aluminum and zinc stearates. While these later materials afforded desirable clarity in the film, they presented other defects almost as serious as did the older types. It was discovered that the stearates were somewhat soluble in certain lacquer solvents commonly used in such compositions, especially at elevated temperatures. Thus, a flat lacquer which had been stored in a warm place would no longer exhibit the same degree of flatness provided in the original composition. Another disadvantage attending the use of stearates as flatting agents resides in their tendency to burnish during shipping and storage of the finished article or even during normal usage of such articles as furniture.

The compositions of the present invention provide the very desirable satin-like finish while eliminating the several known defects inherent to this type of composition as produced by previously known means.

This invention has as an object a provision of a flat cellulose derivative coating composition in which the flatting agent is insoluble in the cellulose derivative solvents and diluents and non-reactive with the other ingredients of the composition. A further object of the invention is the provision of a flat cellulose derivative coating composition in which the flatting agent is unaffected by exposure to sunlight and elevated temperatures. Another object of the invention is a provision of a flatting agent for cellulose derivative coating compositions which has a refractive index approximately that of the cellulose derivative composition, thereby maintaining the original transparency of the composition. A further object is the provision of a flat organic base coating composition which will dry to a dull or flat finish similar to that obtained by the more laborious rubbing operations whereby these expensive and time-consuming, physical and mechanical treatments are eliminated. A still further and more particular object of the invention is the provision of flat organic base coating compositions which will not burnish during shipping and storage and normal use of the article coated with the composition. Other objects will become apparent as the description of the invention proceeds.

These objects are accomplished by the utilization of an incompletely dehydrated silicic acid, one form of which is commercially available as "Silica Gel" as a flatting agent in cellulose derivative lacquers and enamels as hereinafter more fully described.

The following examples are given by way of illustration in accordance with the present invention and no limitations are intended thereby except as indicated in the appended claims:

Example 1

This composition is of utility as a flat lacquer for coating telephone receivers and similar equipment.

| | Per cent |
|---|---|
| Cellulose nitrate (low viscosity) | 10.7 |
| Dibutyl phthalate | 2.8 |
| Ethyl alcohol—denatured | 7.1 |
| Butyl acetate | 35.5 |
| Toluol | 38.9 |
| *Silica Gel mill base | 5.0 |
| | 100.0 |

| *Silica Gel mill base: | Per cent |
|---|---|
| Silica Gel | 36.8 |
| Ester gum | 30.6 |
| Toluol | 30.6 |
| Xylol | 1.8 |
| Milled crepe rubber | 0.2 |
| | 100.0 |

The above mill base is prepared by grinding the ingredients in a ball mill for 10 to 24 hours or for a time cycle of sufficient duration to provide suitable dispersion. This product is then added to the remaining ingredients of the lacquer composition and the mixture thoroughly and uniformly blended by ordinary mixing processes.

The milled crepe rubber is added in this and certain subsequent examples to reduce settling and caking tendencies which may become apparent after extended storage periods. This treatment is described in Coolidge and Holt U. S. Patent 1,863,834.

*Example 2*

This lacquer is of utility in coating wood surfaces, particularly furniture, where a satin-like appearance is frequently the more desirable type of finish.

|  | Per cent |
|---|---|
| Cellulose nitrate (low viscosity) | 8.0 |
| Dibutyl phthalate | 2.0 |
| Damar resin | 8.4 |
| Ethyl alcohol—denatured | 9.3 |
| Toluol | 28.8 |
| Butyl acetate | 24.2 |
| Castor oil | 1.1 |
| *Silica Gel mill base | 18.2 |
|  | 100.0 |

| *Silica Gel mill base: | Per cent |
|---|---|
| Silica Gel | 30.0 |
| Toluol | 70.0 |
|  | 100.0 |

The mill base and finished lacquer of this example are prepared according to the procedure described in Example 1.

*Example 3*

This lacquer is of utility in coating metal surfaces, and particularly in providing a durable, non-burnishing finish of suitable flatness.

|  | Per cent |
|---|---|
| Cellulose nitrate (low viscosity) | 6.3 |
| *Plasticizer | 1.7 |
| Damar resin | 4.6 |
| Ethyl alcohol—denatured | 14.6 |
| Toluol | 33.8 |
| Butyl acetate | 25.2 |
| Amyl alcohol | 5.0 |
| **Synthetic resin | 1.6 |
| Elemi gum | 1.2 |
| ***Silica Gel mill base | 6.0 |
|  | 100.0 |

*A plasticizer consisting essentially of a mixture of ortho and para toluene ethyl sulfonamides.

**A reaction product of 65 parts of glyceryl triphthalate and 35 parts of China-wood oil.

| ***Silica Gel mill base: | Per cent |
|---|---|
| Silica gel | 30.0 |
| Toluol | 68.0 |
| Xylol | 1.8 |
| Milled crepe rubber | 0.2 |
|  | 100.0 |

The mill base and finished lacquer of this example are prepared according to the procedure described in Example 1.

*Example 4*

This composition provides a dull black insulating enamel which is of utility in coating switchboard panels and the like.

|  | Per cent |
|---|---|
| Cellulose nitrate (low viscosity) | 9.7 |
| Damar resin | 5.2 |
| Ethyl alcohol—denatured | 15.9 |
| Butyl acetate | 19.3 |
| Toluol | 17.9 |
| *Silica Gel mill base | 32.0 |
|  | 100.0 |

| *Silica Gel mill base: | Per cent |
|---|---|
| Silica Gel | 11.0 |
| Bone black | 9.4 |
| Carbon black | 4.7 |
| Dibutyl phthalate | 10.3 |
| Castor oil | 6.3 |
| Solvent naphtha | 30.3 |
| Ethyl acetate | 11.9 |
| Pentasol | 12.6 |
| Ethyl alcohol—denatured | 3.5 |
|  | 100.0 |

The mill base and finished enamel of this example are prepared according to the procedure described in Example 1.

*Example 5*

This composition provides a flat green enamel which is of utility in finishing metal surfaces.

|  | Per cent |
|---|---|
| Cellulose nitrate (low viscosity) | 12.0 |
| Damar resin | 3.1 |
| Chrome green pigment | 9.0 |
| Dibutyl phthalate | 4.0 |
| Blown castor oil | 2.6 |
| Ethyl alcohol—denatured | 15.0 |
| Toluol | 24.9 |
| Ethyl acetate | 16.8 |
| Butyl acetate | 4.3 |
| Pentasol | 3.3 |
| *Silica Gel mill base | 5.0 |
|  | 100.0 |

| *Silica Gel mill base: | Per cent |
|---|---|
| Silica Gel | 30.0 |
| Toluol | 68.0 |
| Xylol | 1.8 |
| Milled crepe rubber | .2 |
|  | 100.0 |

The mill base and finished lacquer of this example are prepared according to the procedure described in Example 1.

The "Silica Gel" referred to in the preceding examples is a trade name for incompletely dehydrated silicic acid ($H_2SiO_4$) containing 3 to 7% water. It is derived from the action of an acid such as sulfuric or hydrochloric when mixed simultaneously with sodium silicate under carefully controlled conditions. It is a hard, transparent, glassy substance resistant to most chemical reagents and is supplied either in powdered or granular form by the Silica Gel Corporation, Baltimore, Md. Incompletely dehydrated silicic acid containing more or less water and from other sources of supply, if substantially equivalent in physical and chemical characteristics, is, of course, operable in the present invention.

Compositions based on the use of other cellulose derivatives such as cellulose acetate, cellulose ethers, e. g. ethyl cellulose, when formulated to include a suitable quantity of the new flatting agent, are also included within the purview of the present invention.

The new flatting agent is also of utility in producing the desired satin finish from compositions based on conventional oil type vehicles and also the more modern finishing compositions which include certain synthetic resins, e. g. alkyd resins, urea formaldehyde resins, etc., as their primary and essential ingredients. Because of its chemical inertness, it is of particular utility for use in high acid number alkyd resin compositions where the previously available flatting agents cannot be employed because of their chemical reactivity.

The new flatting agent may be used to advantage in both clear and colored coating compositions where the color may be introduced through the incorporation of pigments and suitable dyes commonly employed in the finishing industry. It may be used jointly with other known flatting agents such as aluminum and zinc stearates but under these conditions the general superiority of the new compositions is correspondingly reduced.

The degree of "flatness" is easily controlled through the actual amount of agent added, the greater the amount incorporated in the composition, the duller the final finish will be. It has been found that a range between 10 parts by weight of cellulose derivative to 0.5 part by weight of the flatting agent and 10 parts by weight of cellulose derivative to about 10 parts by weight of flatting agent includes the various degrees of flatness generally desired in the industry.

The improved compositions are of general utility wherever a flat or satin-like finish is desired. They are of particular importance in connection with finishing wood surfaces, more specifically for finishing furniture and the like where the many desirable characteristics of the new flatting agent are immediately apparent. Pigmented or dyed enamel compositions which include the new flatting agent may be used to advantage in finishing metal and other surfaces. In certain cases where it is desired to obtain a clear flat finish on metal surfaces, the compositions of the present invention are of considerable value.

The new flatting agent provides a flat or satin-like finish without materially affecting the clarity of the finish. Grayness or haze which characterized previously available flat finishes is substantially reduced in the present instance. In addition, the new flatting agent is unusually inert to the influence of failure-producing conditions such as exposure to sunlight. Elevated temperatures have no effect with regard to change in the degree of flatness, a defect which is inherent to many of the previously available flatting agents. A suitable degree of flatness is obtained merely through the drying of the finish without the necessity of laborious and expensive rubbing operations. The degree of flatting may be readily controlled by varying the amount of agent added to the composition, thus eliminating the several uncertainties which characterize the earlier finishes where flatting was obtained by physical or mechanical rubbing or where the degree of flatness might vary also through exposure to light and heat of compositions containing previously available flatting agents. Finally, an important advantage resides in the fact that the flat finish produced in accordance with the present invention is non-burnishing, thus making it far superior to previously available flat finishes where even slight rubbing would frequently cause a burnishing effect on the surface of the finish. Articles finished with the new compositions may be shipped and stored and subjected to normal usage without burnishing of any areas that might be subjected to inadvertent rubbing.

It is apparent that many widely different embodiments of the invention may be made without departing from the spirit and scope thereof, and, therefore, it is not intended to be limited except as indicated in the appended claims.

I claim:

1. A flat, non-burnishing coating composition comprising a cellulose derivative and a flatting agent consisting of powdered commercial silica gel present in amounts between the ratios of 10 parts by weight of cellulose derivative and 0.5 part by weight of said flatting agent and 10 parts by weight of cellulose derivative to 10 parts by weight of said flatting agent, the said silica gel containing about 3 to 7% of water.

2. A flat non-burnishing coating composition comprising cellulose nitrate and a flatting agent consisting essentially of powdered commercial silica gel containing from about 3 to 7% of water and being present in amount between 0.5 and 10 parts for each 10 parts of cellulose nitrate.

JOHN WALDO CLOUGH.